No. 667,317. Patented Feb. 5, 1901.
W. A. HUDSON.
PROCESS OF SEPARATING LEAVES FROM THEIR STEMS.
(Application filed Apr. 21, 1899.)
(No Model.) 3 Sheets—Sheet 1.
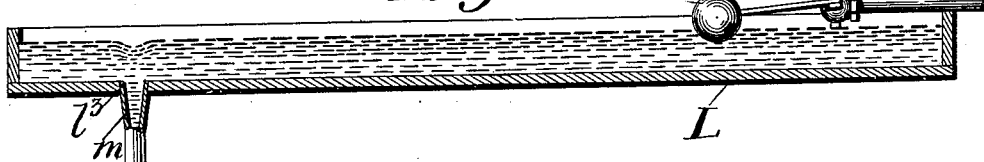
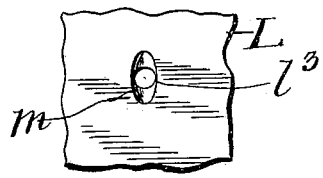
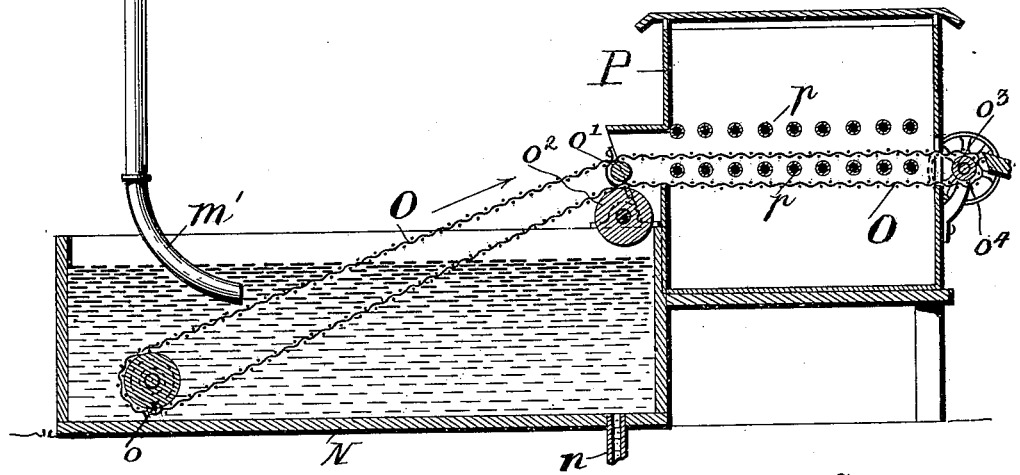

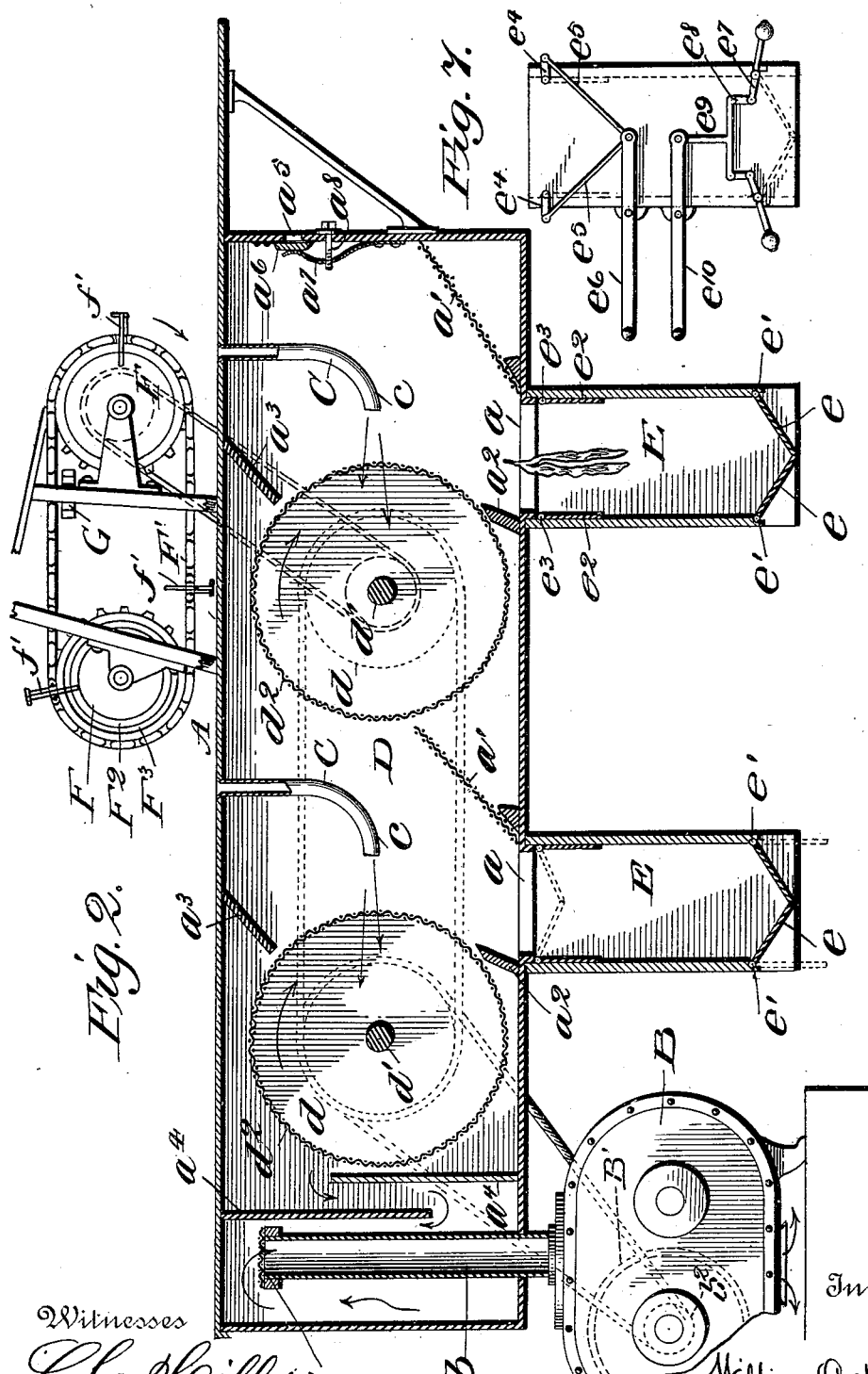

No. 667,317. Patented Feb. 5, 1901.
W. A. HUDSON.
PROCESS OF SEPARATING LEAVES FROM THEIR STEMS.
(Application filed Apr. 21, 1899.)
(No Model.) 3 Sheets—Sheet 3.
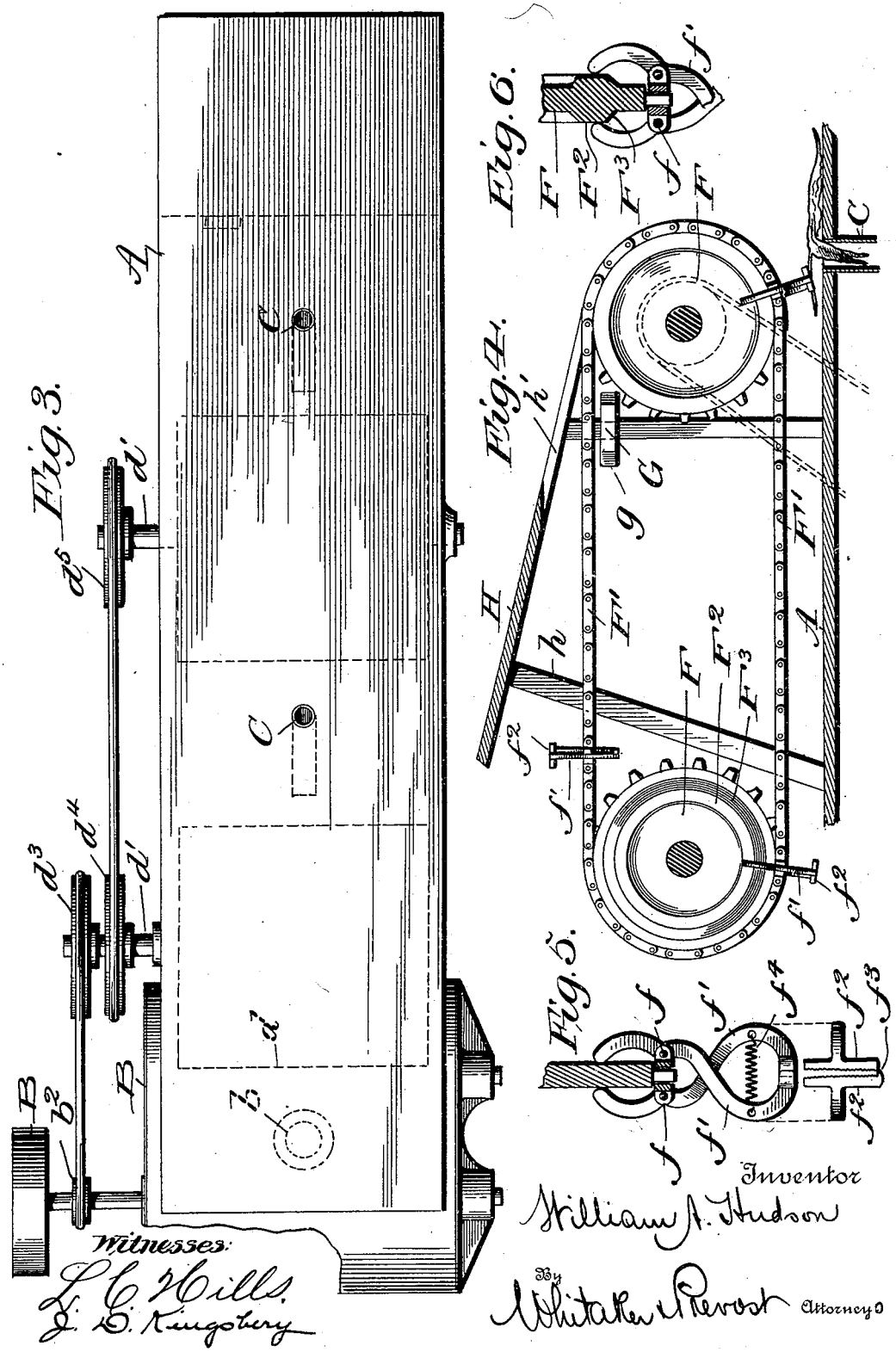

UNITED STATES PATENT OFFICE.

WILLIAM ARCH HUDSON, OF WASHINGTON, DISTRICT OF COLUMBIA, ASSIGNOR, BY MESNE ASSIGNMENTS, TO THE PNEUMATIC TOBACCO STEMMER COMPANY, OF SAME PLACE.

PROCESS OF SEPARATING LEAVES FROM THEIR STEMS.

SPECIFICATION forming part of Letters Patent No. 667,317, dated February 5, 1901.

Original application filed February 28, 1899, Serial No. 707,178. Divided and this application filed April 21, 1899. Serial No. 713,960. (No specimens.)

*To all whom it may concern:*

Be it known that I, WILLIAM ARCH HUDSON, a citizen of the United States, residing at Washington, in the District of Columbia, have invented certain new and useful Improvements in Processes of Separating Leaves from their Stems; and I do hereby declare the following to be a full, clear, and exact description of the invention, such as will enable others skilled in the art to which it appertains to make and use the same.

My invention consists of a new method or process of separating tobacco-leaves from their stems, the characteristic feature of which is that the leaf portion is stripped from the stem by the suction of a current of fluid (whether gaseous or liquid) to the action of which the leaf is presented. This I believe to be broadly new with me.

I shall describe my new method or process in connection with the accompanying drawings, in which I have represented two types of apparatus which may be employed in the practice of my process, the one type employing a current of water and the other a current of air.

In the drawings, Figure 1 represents a sectional view of a water-current apparatus adapted to be used in the practice of my invention. Fig. 1$^a$ is a detail of a part thereof. Fig. 2 is a sectional view of an air-current apparatus adapted to be used in the practice of my invention. Fig. 3 is a top plan view of the same. Fig. 4 is a detail view of a mechanical feeding mechanism for the apparatus shown in Figs. 2 and 3, but capable of use with either form of apparatus. Figs. 5 and 6 are views of one of the grippers of the feeding apparatus. Fig. 7 is a detail view of one of the discharging-hoppers, showing the mechanism for operating the gates thereof.

The object of my invention is to remove the side portions of the leaves of tobacco from the stems without injuring the leaves and in such manner as to have none of the leaf adhere to the stem. I have discovered that by subjecting the leaf to the suction of a current of fluid, such as air or other gas or water or other fluid, and holding the stem firmly the lateral portions of the leaf will be instantly stripped cleanly from the stem. The leaf may be presented to the action of the suction of the current of fluid by hand or by mechanical means, and in either case the stem is gripped, preferably, at a point but a short distance from the apex of the leaf. The action is facilitated by moving the leaf slightly over the vortex of the current in a direction which will bring the portions of the leaf from the point of seizure toward the butt successively over the vortex. The action of stripping the leaf from the stem is practically instantaneous.

In Figs. 1 and 1$^a$ I have shown an apparatus for carrying my invention into effect by means of a current of water. In the said figures, L represents a shallow tank or reservoir provided with an inlet or supply pipe $l$ for delivering water or other liquid thereto. The pipe $l$ is preferably provided with a valve $l'$, to which is attached a regulating-float $l^2$, so that the liquid in the tank is always maintained at a determined depth. In the bottom of the tank is a discharge-orifice $l^3$, preferably of oval form, as shown in Fig. 1$^a$, and M is a discharge-pipe provided at its upper end with a portion $m$, flattened slightly to fit said aperture $l^3$. It is not essential that this aperture $l^3$ should be of the form shown, and it may be circular and of the size of the pipe M, if desired. At the lower end of pipe M, I prefer to provide a receiving-tank N, provided with an outlet $n$, and to provide the lower end of the pipe with a curved portion $m'$, so that the pipe will discharge horizontally and below the level of the liquid in the tank N, as shown. By this means the tobacco-leaves will be delivered into tank N without shock and will not be injured in any way. In order to quickly remove the leaves from the liquid in tank N and to deprive them of the excess of moisture imparted to them by passing through the liquid in tanks L and N and pipe M, I provide a carrier consisting in this instance of an endless belt or apron O, of wire-netting or other suitable perforated material, passing around a roller $o$, mounted in suitable bearings within tank N, below the pipe M, over guide-rollers $o'$ $o^2$, mounted, preferably, on the upper edge of the tank N, and around a driving-roller $o^3$ at a distance from said tank, so that the tobacco-leaves discharged from pipe M will be caught up by the said endless belt or apron and quickly removed from the tank N, the water draining from them through the belt or apron. The roller $o^3$ is operated by means of a driving-pulley $o^4$ from any suitable source of power. P represents a drying-oven through which a portion of the belt or apron I passes, said oven being provided with a heating means, in this instance a series of steam-pipes $p$ $p$. The damp leaves are carried from the tank N through this oven, where they will be partly or wholly dried, as desired, and will then be delivered by the apron O into a suitable receptacle or wherever desired. The operation of this device is as follows: The fluid-supply being turned on through pipe $l$, the fluid will fill tank L to the level determined by the float $l^2$ and valve $l'$ and will maintain this level, while the fluid will run down the pipe M into tank N. At the upper end of pipe M a suction will be created, the downward force of which will be regulated by the weight of the column of water in pipe M. I have found that a column of water from eight to twelve feet in height and from three-quarters of an inch to one and one-half inches in diameter gives good results; but I do not limit myself to any exact size or length of pipe for this purpose. The tobacco-leaves having been previously "cased" or dampened, as is customary before removing the stems, the operator takes the leaves one at a time, gripping them by the stem a short distance from the apex of the leaf, and moves them on the surface of the water over the discharge-orifice of the tank L. The apex of the leaf will be sucked or drawn downward into the pipe M by the suction of the current, and the entire leaf will follow, stripping the lateral portions from the stem and leaving the naked stem in the grip of the operator. It will be noted that the leaf is removed from the stem beginning from a point near the apex of the leaf and running back toward the butt, thus leaving in the flexible portions of the leaf a small part of the extreme end of the stem and all the laterally-extending fibers, as is required by the most careful hand-stemming. The leaf is thus left in a single piece, the two side portions being united at the apex. In its passage down the pipe M and into tank N the leaf is entirely freed from sand, dirt, and other foreign matter, and when discharged into tank N it is caught by the apron O, quickly carried up out of the liquid, being thereby drained, and is then passed by the apron through the drying-chamber P, where the surplus moisture is removed. The leaves may, however, be removed from the tank N by hand, if preferred, and dried in any suitable manner. The time required for the removal of the stem and the passage of the leaf through the pipe M and tank N is but a fraction of a second, and the leaf will not have time to absorb any material quantity of the fluid, so that when delivered by the apron O it will be in substantially the same condition that it was in before the stem was removed.

In Figs. 2 and 3 I have illustrated one form of mechanism which I have devised for carrying out my process by means of a current of air. In this construction A represents an air-tight trunk or chest made of wood or metal and of sufficient strength to withstand the external air-pressure thereon when the machine is in operation. B represents a positive rotary exhaust-fan having an inlet-pipe $b$, connected with the air trunk or chest, preferably adjacent to the top thereof. In this instance the pipe $b$ is vertical and extends through an aperture in the bottom of the air-chest and to a point adjacent to the top of the same, where it is provided with a suitable screen $b'$ of any desired construction to prevent any foreign matter from passing into the fan B. The air-chest A is provided with one or more stripping-tubes C, according to the capacity of the air-exhausting fan. In this instance I have shown the air-chest provided with two of such stripping-tubes; but it is obvious that by making the air-chest of greater length and employing an exhauster of the required power and capacity any number of such stemming-tubes can be provided. Each of the stemming-tubes has its upper end extending through an aperture in the top of the air-chest, and I prefer to have the top of the tube flush with the top face of the box, which may thus serve as a table or work-support when the machine is fed by hand. Each of the tubes C is curved at its lower end, as indicated at $c$, toward the point from whence the air is exhausted from the air-chest, so that the lower end of the tube extends horizontally in the direction of the air-current as it leaves the tube, as indicated by the arrows in Fig. 2. The upper end of each tube is preferably slightly flared or rounded over, so as to present no sharp edges to the leaf in entering the tube. Adjacent to the delivery end of each of the stemming-tubes is a revoluble drum D, consisting of heads $d$, mounted on a shaft $d'$, journaled in the sides of the air-chest, said heads being provided with a cylindrical covering $d^2$ of wire gauze or netting, which will permit the air to pass freely through the drum, but will arrest the leaf, as hereinafter described. Below each of the drums D D the air-chest is provided with a discharge-aperture $a$, the center of which will preferably be located perpendicularly below the portion of the periphery of the drum nearest the discharge end of its adjacent stemming-tube, so that the leaves delivered against the drums will be carried downward thereby, the drums rotating in the direction indicated by the arrows, out of the current of air, when they will fall by their own weight through the discharge-apertures $a$ $a$. Below each of the apertures $a\ a$ is a discharging-hopper E, connected with the air-chest and provided at its lower end with a pair of air-tight doors or gates $e\ e$, which open away from each other and are mounted upon shafts $e'\ e'$. At the upper end of the hopper E is a second pair of doors $e^2\ e^2$, which are normally open and lie against the vertical sides of the hopper and are mounted on shafts $e^3\ e^3$. The shafts $e^3\ e^3$ are provided each with an arm $e^4$, said arms being connected by links $e^5\ e^5$ to an operating-lever $e^6$, pivoted to the outside of the hopper, by means of which said doors $e^2\ e^2$ can be opened and closed. The shafts $e'\ e'$ are also provided with arms $e^7\ e^7$, which are connected by links $e^8\ e^8$ to the laterally-extending arms of an inverted-T-shaped link $e^9$, which is in turn connected to a lever $e^{10}$, pivoted to the hopper, for operating the lower doors. When it is desired to discharge the contents of the hopper E, the lever $e^6$ is moved so as to close the upper doors $e^2\ e^2$, thereby cutting off communication between the hopper and the air-chest, and the doors $e\ e$ are then opened by means of lever $e^{10}$ to discharge the stemmed leaves without stopping the operation of the machine or letting any considerable amount of air into the air-chest. After discharging the contents of the hopper E the lower doors are closed and the upper doors are opened, thereby permitting the leaves to fall into the hopper. Any leaves falling upon the upper doors during the brief time that the lower doors are open will be dropped into the hopper when the doors are restored to their normal positions. I do not limit myself to the exact details of the constructions herein shown and described for discharging the leaves after they are stemmed, as many variations may be made therein without departing from my invention, but the constructions shown provide a convenient means for discharging the stemmed leaves. $a'\ a'$ represent inclined deflectors, preferably formed of wire-gauze, for guiding the leaves into the hoppers in case any should fall thereon, and $a^2\ a^2$ represent shields which extend from the bottom of the air-chest, adjacent to the side of the discharge-orifices, toward the air-outlet, up to a point adjacent to the periphery of the drum, to prevent any leaves from being carried beneath the drum. I also prefer to provide the upper part of the air-chest with inclined plates $a^3\ a^3$, extending from the top of the chest almost to the periphery of the drum, as shown, although these are not essential. $a^4\ a^4$ are baffle-plates provided in the air-chest to prevent sand or fine particles of dirt or foreign matter from being carried to the air-pipe $b$, leading to the fan. In order to prevent the air-chest from being subjected to too great external pressure caused by the establishing of a partial vacuum within the same, and also to maintain the current of air passing through tubes C C at substantially the same force and velocity, even if they are partly closed by the passage of a leaf therethrough, I provide the chest A with an aperture $a^5$, (which is normally closed by a valve $a^6$,) operated upon by a spring $a^7$, which is provided with an adjusting-screw $a^8$, extending outside of the air-chest, by which the tension of the spring may be adjusted. When several tubes are used simultaneously, the leaf in passing through the tubes will partially close them, and this would increase the partial vacuum within the air-chest and the suction through the tubes very greatly if it were not for the valve $a^6$. In such cases the valve opens more or less, admitting air, and thus automatically relieves the tension of the air-current and keeps the pressure of the current passing through the tubes C C substantially equal at all times, whether one or more of the tubes is partially closed by the passage of a leaf. The main or driving shaft of the fan B is provided with a band-wheel B' or equivalent device for operating the same from a source of power, and power will also be used to operate the drums D D. In this instance I have shown the driving-shaft of the fan provided with a small grooved pulley $b^2$, which is connected by a belt or rope with a larger grooved pulley $d^3$ on the adjacent drum-shaft $d'$, said shaft being provided with a second pulley $d^4$, connected by a belt with a similar pulley $d^5$ on the shaft $d'$ of the other drum. The drums will ordinarily be driven at a very moderate speed. The operation of this construction is as follows: The leaf is presented to the upper end of one of the tubes C, being gripped at a point a few inches from the tip and held while the leaf is drawn across the upper end of the tube C. The suction of the air-current will draw the leaf into the tube and strip it from the stem, and the leaf will be delivered against the drum D, which is continuously rotating, and which will carry the leaf downward out of the air-current and allow it to drop into the hopper E. The air acting upon the leaf while it is being stemmed and while on the periphery of the drum within the range of the air-current will free it from sand, dirt, &c., which will fall upon the bottom of the air-chest, from which it can be removed from time to time in any desired way.

In Figs. 4, 5, and 6 I have shown one form of feeding device for mechanically presenting the leaves to the action of the suction of the air-current and holding back the stem while drawing it over the upper end of the stemming-tube. In these figures, F F represent the sprocket-wheels, mounted upon the top of the air-chest A in suitable bearings and provided with a chain F'. Certain links of said chain, located at intervals, are provided with laterally-extending ears $f\ f$, to which are pivoted levers $f'\ f'$, the outer ends of which are provided with gripping-jaws $f^2\ f^2$, roughened upon their inner faces, one of said jaws preferably carrying a sharpened projection or knife $f^3$, as shown in Fig. 6, which when the jaws close upon the stem will sever the stem and facilitate the removal of the leaf therefrom, although this is not essential. The outer ends of said levers are adapted to engage a stationary cam or rail G, having wedge-shaped end portions $g$ $g$. The jaws $f^2$ $f^2$ are normally held together by a spring $f^4$ and are only opened for a brief moment when the levers are opened by the cam G, during which period a leaf is presented to said jaws, so that they will close on the stem thereof as the levers $f'$ $f'$ slide out of engagement with the cam G. One of the sprocket-wheels will be driven by a belt or otherwise from any suitable source of power, in this instance from the shaft of one of the drums D, as shown in Fig. 1. One of these mechanical feeding devices will be employed for each tube C, as will be readily understood. A mechanical feed of this construction can also obviously be used in connection with the construction shown in Fig. 1. H represents a feeding-table which is preferably employed in connection with this form of mechanical feed. This table H is supported in a slightly-inclined position by suitable braces $h$ from the top of the air-chest and is provided with a central slot $h'$ at its lower end to allow the gripping-jaws to pass through to the upper side of the table H, where the operator will insert the stems of the leaves therein. In order to open the jaws to release the stems after the leaves have been stripped therefrom, I have shown the sprocket-wheel F farthest from the stemming-tube provided with an annular cam $F^2$ on each side, having an inclined face $F^3$ extending toward the periphery of the wheel. As the grippers move along toward wheel F on the lower lap of the chain the arms $f'$ $f'$ will engage the inclined faces $F^3$ $F^3$ and move across the same until they engage the parallel faces $F^2$ $F^2$ of the cam, thereby opening the jaws of the grippers and holding them open until they leave the wheel F on the upper side and pass toward the other sprocket-wheel, as will be understood by reference to Figs. 4 and 6.

In Fig. 1 I have shown the air-chest provided with a mechanical feed of the kind just described for one of the stemming-tubes only, the other tube being in this instance fed by hand.

I do not herein specifically claim the process of or apparatus for stemming by means of a current of water or other liquid, as such subject-matter is fully covered by my application for Letters Patent of the United States filed February 28, 1899, and given Serial No. 707,178.

The apparatus herein shown and described for carrying my process into effect is not herein specifically claimed, the same being broadly covered by my application for Letters Patent of the United States filed June 8, 1900, and given Serial No. 19,603, which is a division of this application.

What I claim, and desire to secure by Letters Patent, is—

1. The process of separating the flexible portions of tobacco-leaves from their stems, which consists in presenting the leaf to the suction of a current of fluid, and holding back the stem, whereby the leaf is sucked into said current and stripped from the stem, substantially as described.

2. The process of separating the flexible portions of tobacco-leaves from their stems which consists in gripping the stem at a point adjacent to the apex of the leaf and presenting the leaf to the suction of a current of fluid, whereby the leaf is stripped from the stem, substantially as described.

3. The process of separating the flexible portions of tobacco-leaves from their stems, which consists in creating a current of air, presenting the leaf to the suction of the air-current, and holding back the stem, whereby the leaf is sucked into said air-current and stripped from the stem, substantially as described.

4. The process of separating the flexible portions of tobacco-leaves from their stems which consists in creating a current of air, presenting the leaf to the suction of the air-current, holding back the stem and moving the stem in a direction substantially at right angles to the direction of action of the said air-current, substantially as described.

In testimony whereof I affix my signature in the presence of two witnesses.

WILLIAM ARCH HUDSON.

Witnesses:
L. P. WHITAKER,
J. D. KINGSBERY.